US008828904B2

United States Patent
Wei et al.

(10) Patent No.: US 8,828,904 B2
(45) Date of Patent: Sep. 9, 2014

(54) INORGANIC/ORGANIC HYBRID TOTALLY POROUS METAL OXIDE PARTICLES, METHODS FOR MAKING THEM AND SEPARATION DEVICES USING THEM

(71) Applicant: Intellectual Property Administration, Loveland, CO (US)

(72) Inventors: Ta-Chen Wei, Newark, DE (US); Wu Chen, Newark, DE (US); William E. Barber, Landenberg, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1 day.

(21) Appl. No.: 13/712,597

(22) Filed: Dec. 12, 2012

(65) Prior Publication Data

US 2013/0102459 A1   Apr. 25, 2013

Related U.S. Application Data

(62) Division of application No. 12/201,817, filed on Aug. 29, 2008, now Pat. No. 8,357,628.

(51) Int. Cl.
| | |
|---|---|
| *B01J 20/00* | (2006.01) |
| *B01J 20/22* | (2006.01) |
| *C01B 33/12* | (2006.01) |
| *C01G 23/047* | (2006.01) |
| *C01G 25/02* | (2006.01) |
| *C01F 7/02* | (2006.01) |
| *B01J 20/06* | (2006.01) |
| *C01G 23/00* | (2006.01) |
| *C01B 33/00* | (2006.01) |

(52) U.S. Cl.
CPC ........ *B01J 20/06* (2013.01); *B01J 20/00* (2013.01); *C01G 25/02* (2013.01); *C01G 23/00* (2013.01); *C01B 33/00* (2013.01)
USPC ........... 502/400; 502/401; 502/407; 423/335; 423/610; 423/608; 423/628

(58) Field of Classification Search
None
See application file for complete search history.

(56) References Cited

U.S. PATENT DOCUMENTS

| | | | |
|---|---|---|---|
| 3,505,785 A | 4/1970 | Kirkland | |
| 3,634,558 A | 1/1972 | Stober | |
| 4,017,528 A | 4/1977 | Unger et al. | |
| 4,775,520 A | 10/1988 | Unger | |
| 4,983,369 A | 1/1991 | Barder | |
| 5,057,296 A | 10/1991 | Beck | |
| 5,098,684 A | 3/1992 | Kresge | |
| 5,780,004 A * | 7/1998 | Balducci et al. | 423/326 |
| 6,319,868 B1 * | 11/2001 | Gani et al. | 501/80 |
| 6,649,083 B1 * | 11/2003 | Pinnavaia et al. | 252/179 |

(Continued)

OTHER PUBLICATIONS

Bruce, et al. (2006) Synthesis of Order Mesoporous Fe3O4 and gamma Fe2O3 with crystalline Walls Using Post-Template Reduction/Oxidation, Journal American Chemical Society; 130, 14108-14110, 12905-12909.

(Continued)

*Primary Examiner* — Guinever Gregorio
(74) *Attorney, Agent, or Firm* — Milstein Zhang & Wu LLC

(57) ABSTRACT

The present invention is a process for making an inorganic/organic hybrid totally porous spherical silica particles by self assembly of surfactants that serve as organic templates via pseudomorphic transformation.

9 Claims, 2 Drawing Sheets

Scanning electron micrograph of (a) the 5.6 um Rx SIL particles and (b) the particles after transformation

(56) References Cited

U.S. PATENT DOCUMENTS

| | | | |
|---|---|---|---|
| 6,686,035 B2 | 2/2004 | Jiang | |
| 7,014,915 B2 * | 3/2006 | Cordaro | 428/402 |
| 7,223,473 B2 | 5/2007 | Jiang | |
| 7,968,490 B2 * | 6/2011 | Takeshima et al. | 502/302 |
| 8,323,594 B2 * | 12/2012 | Schutte et al. | 423/69 |
| 8,685,283 B2 * | 4/2014 | Wei et al. | 252/408.1 |
| 2006/0001988 A1 | 1/2006 | Mizukoshi | |
| 2006/0039507 A1 | 4/2006 | Rustamov | |
| 2007/0189944 A1 * | 8/2007 | Kirkland et al. | 423/118.1 |
| 2007/0089944 A1 | 9/2007 | Pfefferle | |
| 2007/0251870 A1 * | 11/2007 | Henderson et al. | 210/198.2 |
| 2008/0069368 A1 | 6/2008 | Bang | |
| 2008/0193734 A1 | 8/2008 | Whitnall | |

OTHER PUBLICATIONS

Corma, et al. (1997) Synthesis of MCM-41 with Different Pore Diameters, without Addition of Auxiliary Organics, Chern. Mater, 1997, 9, 2123-2126.

Dong-Jun Kim, et al. (2004) Morphology Control of Organic-Inorganic Hybrid Mesoporous Silica by Microwave Heating, The Chemical Society of Japan, Chemistry Letters Vo. 33, No. 4.

GRin, et al. (2007) Comparative study of the performance of columns packed with several new fine silica particles Would the external roughness of the particles affect column properties?; Journal of Chromatography A, 1166, 30-46.

Inagaki (1999) Novel Mesoporous Materials with a Uniform Distribution of Organic Groups and Inorganic Oxide in Their Frameworks, J. Am. Chem. Soc. 121, 9611-9614.

Jiao, et al. (2007) Mesoporous Mn2O3 and Mn3O4 with Crystalline Walls, Advanced Materials; 19, 4063-4066.

Kapoor (2004) Synthesis of Phenylene Bridged Mesoporous Silsequioxanes with Spherical Morphology in Ammonia Solution, The Chemical Society of Japan, Chemistry Letters vol. 33, No. 2.

Kimura, et al. (1998) Synthesis of mesoporous aluminophosphates using surfactants with long alkyl chain lengths and triisopropylbenzene as a solubilizing agent, Chem. Commun.

Kirkland (2000) Superficially porous silica microspheres for fast high-performance liqUid chromatography of macromolecules, Journal of Chromatography A, 890, 3-13.

Kresge ( ) Ordered mesoporous molecular sieves synthesized by a liquid-crystal template mechanism, Nature vol. 359.

LeFevre, et al. (2005) Synthesis of Large-Pore Mesostructured Micelle-Templated Silicas as Discrete Spheres, Chem Mater. 2005, 17, 601-607.

Martin (2002) Morphological Control of MCM-41 by Pseudomorphic Synthesis, Angew. Chem. Int. Ed. 2002, No. 14; 41.

Melde (1999) Mesoporous Sieves with Unived Hybrid Inorganic/Organic Frameworks, Chem. Mater. 1999, 11, 3302-3308.

Rebbin (2004) Synthesis and characterisation of spherical periodic mesoporous organosilicas (sph-PMOs) with variable pore diameters, Microporous and Mesoporous Materials 72, 99-104.

Sayari (1998) New Approaches to Pore Size Engineering of Mesoporous Silicates, Adv. Mater. 1998, 10, No. 16; 10.

Schuth, et.al. (2008) Pseudomorphic Transformation of Highly Ordered Mesoporous C0304 to CoO via Reduction with Glycerol; Journal American Chemical Society; 130, 14108-14110.

Stein, et al. (2004) Multistep, Low-Temperature Pseudomorphic Transformations of Nanostructured Silica to Titania Via a Titanium Oxyfluoride Intermediate, Chemistry of Materials; 16, 3829-3837.

Ulagappan (1996) Evidence for supramolecular organization of alkane and surfactant molecules in the process of forming mesoporous silica, Chem. Commun., 1996.

Yoshina, et al. (1999) Periodic mesoporous organosilicas, PMOs: fusion of organic and inorganic chemistry 'inside' the channel walls of hexagonal mesoporous silica; 1999; Chem. Commun. 2539-2540.

\* cited by examiner

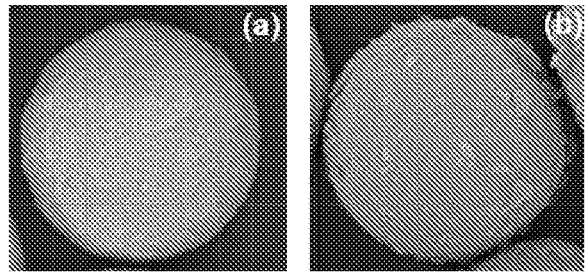
Figure 1. Scanning electron micrograph of (a) the 5.6 um Rx SIL particles and (b) the particles after transformation
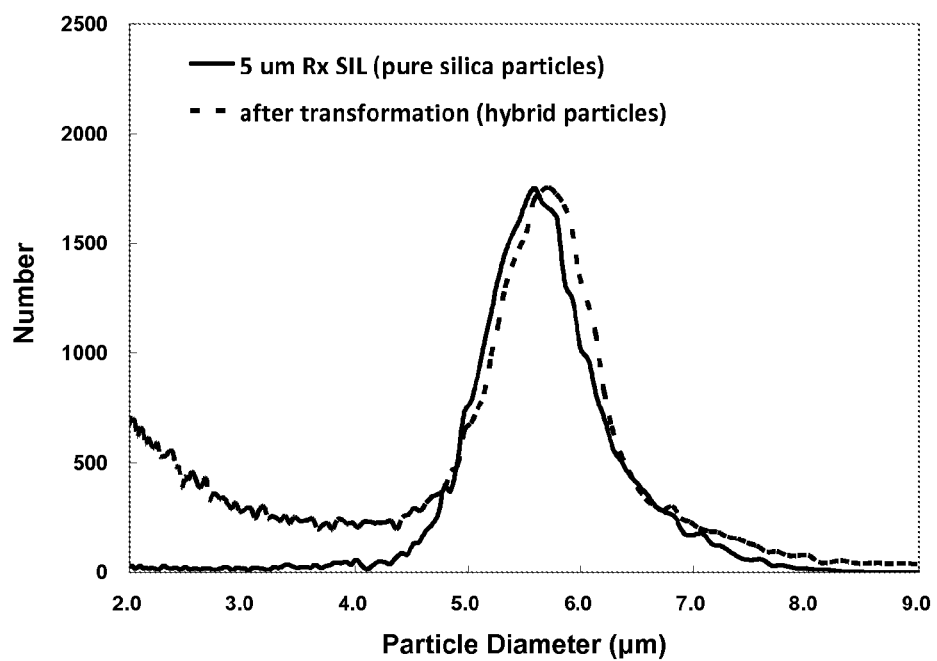
Figure 2. Particle size distribution of 5.6 um RX SIL particles and the particles after transformation (Example 1)

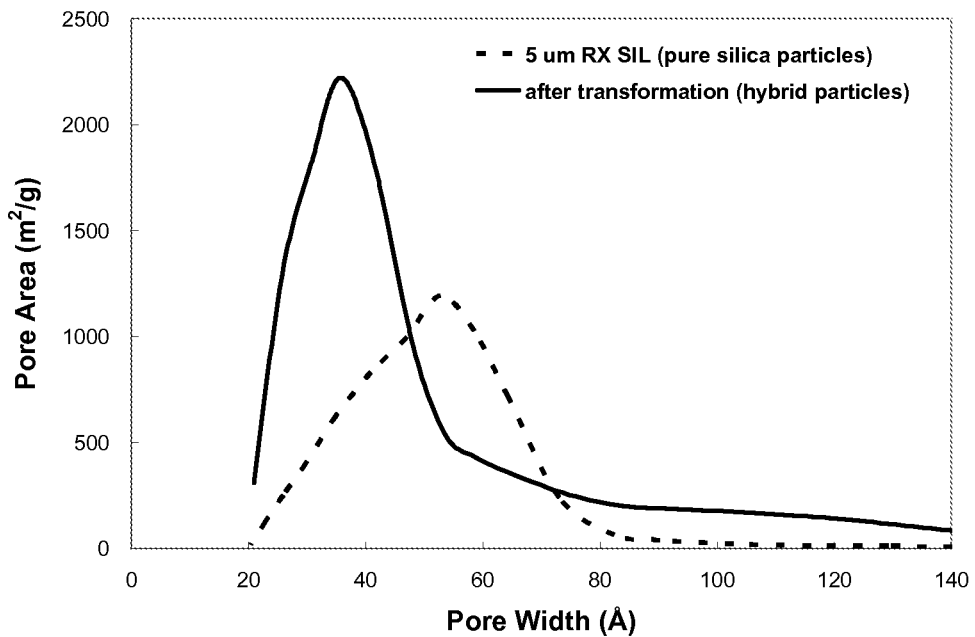
Figure 3. Pore size distribution of 5.6 um RX SIL particles and the particles after transformation (Example 1)
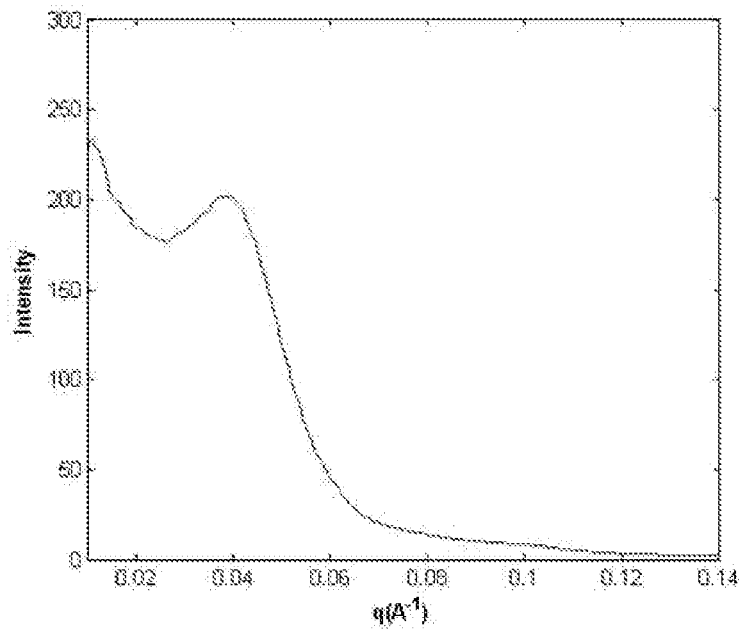
Figure 4. is a small angle powder x-ray diffraction pattern of the product of Example 1.

INORGANIC/ORGANIC HYBRID TOTALLY POROUS METAL OXIDE PARTICLES, METHODS FOR MAKING THEM AND SEPARATION DEVICES USING THEM

RELATED APPLICATIONS

This application claims the benefit of priority from and is a divisional application of U.S. application Ser. No. 12/201,817, filed Aug. 29, 200, which is incorporated herein by reference in its entirety.

FIELD OF THE INVENTION

This invention relates to totally porous hybrid metal oxide particles, and a process for making such particles by self assembly with surfactants serving as organic templates through pseudomorphic transformation. The particles are useful in separation devices (e.g., HPLC).

BACKGROUND OF THE INVENTION

Hybrid metal oxide—particularly silica—particles involve covalent bonds between organic and inorganic components within the particles. Hybrid silica particles in particular have become very popular high pressure liquid chromatography ("HPLC") packing materials for HPLC columns because of the particles' stability at high pH and high physical strength.

One general method for preparing hybrid totally porous silica particles is an emulsion polymerization method (see, e.g., U.S. Pat. Nos. 4,017,528, 6,686,035, and 7,223,473 and WO2006039507). This method involves emulsion polymerization of an organic siloxane polymer precursor in emulsion droplets in the presence of polyethylene glycol ("PEG") or toluene as a porogen, in which the siloxane polymer precursor contains an organic moiety such as a methyl group or ethylene bridging group. The PEG or toluene is later washed out, reducing or eliminating the need for high temperature burn-off.

In 1999, porous hybrid periodic meso-organosilicas ("PMOs") were introduced by various research groups using a micelle-templating method (e.g., Inagaki, et al., *J. Am. Chem. Soc.*, 121, 9611, 1999; Melde, et al., *Chem. Mater.*, 11, 3302, 1999; Ishii, et al., *Chem. Commun.*, 2539, 1999). The mechanism of forming the pore structure is based on self assembly of surfactants described in U.S. Pat. No. 5,098,684 where highly ordered mesoporous silica with high surface area was reported. The relatively uniformly sized pores formed after removing the surfactants were generally in an ordered periodic arrangement. PMOs have the advantage of micelle-templated mesoporous materials such as ordered pore structures and high specific surface areas but also that of hybrid materials such as high pH stability and high physical strength. However, the porous materials mentioned above all have irregular shapes which limit their applications in chromatography.

Very recently, some have attempted to synthesize spherical PMO particles for chromatography applications. However, to control the PMO particle morphology, particle size, particle size distribution, and pore size and pore size distribution simultaneously and precisely is still a great challenge. Kapoor and Inagaki reportedly prepared phenylene-bridged PMO particles with a pore size of 2 nm and particle size distributed from 0.6 to 1.0 μm (Kapoor, M. P., Inagaki, S., *Chemistry Letters*, 33, 88, 2004). Rebbin et al. reportedly prepared ethane-bridged PMO particles with an average size of 0.4~0.5 μm and a pore size of 3 nm (Rebbin et al., *Micro. Meso. Mater.* 72, 99, 2004). Kim reportedly synthesized ethane-bridged PMO particles with sizes from 1.5 to 2.5 μm and an average pore sizes of 3.2 nm by microwave heating. However, PMO particle size distributions are poor according to SEM images (see, Kim et al., *Chemistry Letters*, 33, 422, 2004).

Ultimately, monodisperse particles having average sizes between 1.0 and 5.0 μm and pore sizes larger than 5.0 nm are needed for HPLC applications. In addition, narrow particle size and pore size distributions are preferred. So far, there are no methods of making totally porous PMO particles that can meet these requirements.

Another method known as pseudomorphic transformation was proposed by

Martin to make ordered mesoporous pure silica spheres (see *Angew. Chem. Int. Ed.*, 41 (2002) 2590). Pseudomorphism is a term used by mineralogists to describe phase transformation that does not change the shape of a material. Pseudomorphic synthesis, assisted by surfactant, for mesoporous pre-shaped silica particles can form a highly ordered narrow mesopore size distribution, high specific surface areas and pore volumes without changing the initial shapes of the silica particles. For example, K. Unger reportedly synthesized 10 μm totally porous pure silica particles with pore diameter ranging from 7 to 9 nm, specific surface area of 900 m²/g, and pore volume of 1.5 ml/g ("Synthesis of Large-Pore Mesostructured Micelle-Templated Silicas as Discrete Spheres", *Chem. Mater.*, 2005, 17, 601-607).

SUMMARY OF THE INVENTION

One aspect of this invention is a method for making totally porous particles, comprising subjecting substantially totally porous metal oxide particles selected from silica, alumina, zirconia, or titania, in an aqueous solution to agitation for a time and a pH sufficient to pseudomorphically transform said particles, in the presence of one or more surfactants, and wherein either (a) the totally porous particles comprise an organically modified metal oxide hybrid or (b) the pseudomorphic transformation of the particles is carried out in the presence of an organic metal alkoxide to form totally porous metal oxide hybrid particles.

Another aspect of this invention includes totally porous particles, comprising: (a) an organic metal oxide selected from one or more of the formulae VII or VIII:

$$MO_2/(R^1_p R^1_q MO_t)_n \qquad (VII)$$

$$MO_2/[R^2(R^1_r MO_t)_m]_n \qquad (VIII)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more M atoms; p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is selected from Si, Ti, or Zr;

(b) with a median pore size range from about 15 to about 1000 Å;
  (c) a specific surface area of from about 5 to about 1000 m²/g; and
  (d) a median size range from about 0.5 μm to about 100 μm.

Yet another aspect of this invention includes totally porous particles, comprising:

(a) an organic metal oxide selected from one or more of the formulae IX or X:

$$Al_2O_3/(R^1AlO)_n \quad (IX)$$

$$Al_2O_3/[R^2(AlO)_m]_n \quad (X)$$

wherein $R^1$ is as defined previously; $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100;

(b) with a median pore size range from about 15 to about 1000 Å;
(c) a specific surface area of from about 5 to about 1000 $m^2/g$; and
(d) a median size range from about 0.5 µm to about 100 µm.

Yet another aspect of this invention includes totally porous particles, comprising an organic metal oxide having a composition selected from one or more of formulae XI-XIV:

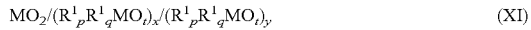
$$MO_2/(R^1_pR^1_qMO_t)_x/(R^1_pR^1_qMO_t)_y \quad (XI)$$

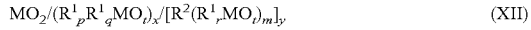
$$MO_2/(R^1_pR^1_qMO_t)_x/[R^2(R^1_rMO_t)_m]_y \quad (XII)$$

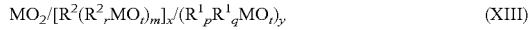
$$MO_2/[R^2(R^2_rMO_t)_m]_x/(R^1_pR^1_qMO_t)_y \quad (XIII)$$

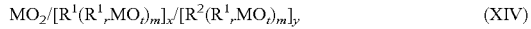
$$MO_2/[R^1(R^1_rMO_t)_m]_x/[R^2(R^1_rMO_t)_m]_y \quad (XIV)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å; a specific surface area of from about 5 to about 1000 $m^2/g$; and a median size range from about 0.5 µm to about 100 µm.

Yet another aspect of this invention includes totally porous particles, comprising an organic metal oxide having a composition selected from one or more of formulae XV-XVIII:

$$Al_2O_3/(R^1AlO)_x/(R^1AlO)_y \quad (XV)$$

$$Al_2O_3/[R^2(AlO)_m]_x/(R^1AlO)_y \quad (XVI)$$

$$Al_2O_3/(R^1AlO)_x/[R^2(AlO)_m]_y \quad (XVII)$$

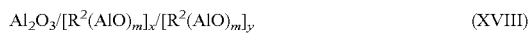
$$Al_2O_3/[R^2(AlO)_m]_x/[R^2(AlO)_m]_y \quad (XVIII)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more Al atoms; m is an integer greater than or equal to 2; and x and y each is independently a number from 0.01 to 100; with a median pore size range from about 15 to about 1000 Å; a specific surface area of from about 5 to about 1000 $m^2/g$; and a median size range from about 0.5 µm to about 100 µm.

Yet another aspect of this invention includes separation devices that contain the totally porous particles described above.

BRIEF DESCRIPTION OF THE DRAWINGS

FIG. 1 is a scanning electron micrograph of (a) the 5um Rx SIL particles and (b) the particles after transformation (Example 1).

FIG. 2 is a chart of particle size distribution of 5 um Rx SIL particles and the particles after transformation (Example 1).

FIG. 3 is a chart of pore size distribution of 5 um Rx SIL particles and the particles after transformation (Example 1).

FIG. 4 is a small angle powder X-ray diffraction pattern of the product of Example 1.

DETAILED DESCRIPTION OF THE PREFERRED EMBODIMENTS

The present invention provides a process for making novel totally porous hybrid metal oxide particles from totally porous metal oxide particles, with ordered pores and narrow pore size distribution, specifically where the median pore size ranges from about 15 to about 1000 Å.

As mentioned above, one aspect of this invention is a method for making totally porous particles, comprising subjecting substantially totally porous metal oxide (starting material) particles selected from silica, alumina, zirconia, or titania, in an aqueous solution to agitation for a time and a pH sufficient to pseudomorphically transform said particles, in the presence of one or more surfactants and swelling agents, and wherein either (a) the totally porous particles comprise an organically modified metal oxide hybrid or (b) the pseudomorphic transformation of the particles is carried out in the presence of an organic metal alkoxide to form totally porous metal oxide hybrid particles.

The starting materials made by any traditional methods such as spray dry method, sol-gel method, coacervation and emulsion polymerization can be used to make the novel metal oxide particles of this invention with the inventive process. Such processes yield totally porous metal oxide particle starting materials that can be either substantially pure metal oxide particles selected from silica, alumina, titania or zirconia, or hybrid totally porous particles that are made from silica, alumina, titania or zirconia.

By "pseudomorphic transformation" or "pseudomorphically transform," we mean process conditions that allow the totally porous metal oxide particle starting materials to be dissolved externally and internally and re-precipitated immediately both externally and internally into the interstitial spaces between the micelles resulting in micelle-templated pores in the particles with ordered pore structures such that the final particles keep a similar size and morphology as the original particles (except for pore structure), and thus retain substantially the particle size distribution of the original starting particles, after pseudomorphic synthesis.

Metal oxides of silica, alumina, zirconia and titania can be dissolved in either strong basic or acidic solution, depending on the metal oxide, which is known. For example, metal oxides of silica, alumina, zirconia and titania can be dissolved in either one or both of a strong basic or acidic solution. In the process of this invention, the starting material particles are dissolved, and at the same time, are re-deposited to form new hybrid particles with the particle size and shape unchanged but with a modified pore size and pore structure. For example, in the case of alumina particles, acidic pH can be used for dissolution of alumina and negatively charged surfactants or non-ionic surfactants can be used to form pores. Where the starting particles comprise silica, the solution can contain fluoride ion such as hydrofluoric acid or ammonium fluoride. For example, silica can be dissolved in the presence of hydrofluoric acid at a concentration from 50 ppm to 5000 ppm. Most preferably, the silica particles can be dissolved where the pH of the solution is basic from about 10 to about 13.5, more preferably from about 12 to about 13.5 The base used to achieve such basic pH is preferably one such as ammonium hydroxide.

As far as a sufficient temperature for the process of this invention, the solution is either under reflux or in an autoclave at a temperature higher than about 50° C. from one hour to seven days, preferably under reflux. By "under reflux" we are referring to the technique where the solution, optionally under stirring, inside a reaction vessel is connected to a condenser, such that vapors given off by the reaction mixture are cooled back to liquid, and sent back to the reaction vessel. The vessel can then be heated at the necessary temperature for the course of the reaction. The purpose is to accelerate the reaction thermally by conducting it at an elevated temperature (e.g., the boiling point of the aqueous solution). The advantage of this technique is that it can be left for a long period of time without the need to add more solvent or fear of the reaction vessel boiling dry as the vapor is condensed in the condenser. In this invention, we prefer to reflux the mixtures described above for less than about 7 days, preferably at least one hour, more preferably from about 2 to about 72 hours at a temperature of from about 75 to about 110° C., more preferably from about 85 to about 100° C.

By "agitation," we mean sufficient movement of the solution containing the particles so that the particles do not agglomerate. Agitation can be done by stirring, sparging, ultrasonicating, shaking and the like. We prefer stirring the mixture.

As mentioned previously, the processes of this invention utilize a surfactant.

We prefer one or more ionic surfactants or non-ionic surfactants. More preferably, the surfactant is selected from one or more of the group of polyoxyethylene sorbitans, polyoxythylene ethers, block copolymers, alkyltrimethylammonium, alkyl phosphates, alkyl sulfates, alkyl sulfonates, sulfosuccinates, carboxylic acid, surfactants comprising an octylphenol polymerized with ethylene oxide, and combinations thereof. Most preferably the surfactant(s) is selected from one or more of a compound of the formula $C_nH_{2n+1}(CH_3)_3NX$ where X is selected from chloride and bromide, and n is an integer from 10 to 20. Preferred surfactants include trimethyloctadecylammonium bromide and hexadecyltrimethylammonium bromide.

The process preferably employs a swelling agent that can dissolve into the surfactant micelles. The swelling agent causes the surfactant micelles to swell, increasing (adjusting) the size of the pores to the desired size. Preferably, the mixture of the pH adjuster (the base or acid), porous silica (or other metal oxide) particles and surfactant is heated for a time (e.g., 20 minutes to 1.5 hours) at a temperature of from 30 to 60° C. before the swelling agent is added. The mixture containing the swelling agent is heated from 15 min to one month (but preferably less than about 7 days) at a temperature of from about 75 to about 110° C. Whereupon the mixture is preferably refluxed as described above.

Preferred swelling agents include but are not limited to an alkyl substituted benzene, a dialkylamine, a trialkylamine, a tetraalkyl ammonium salt or an alkane of the formula ($C_nH_{2n+2}$) where n is an integer of 5-20 (ref: Ulagappan, N., *Chem. Commun.*, 1996), a cycloalkane of the formula ($C_nH_{2n}$) where n is an integer of 5-20, a substituted alkane of the formula (X—$C_nH_{2n+1}$) where n is an integer of 5-20 and X is chloro-, bromo-, or —OH, or a substituted cycloalkane of the formula (X—$C_nH_{2n-1}$) where n is an integer of 5-20 and X is chloro-, bromo-, or —OH. More preferred swelling agents include trimethylbenzene (ref: Beck, J. S. U.S. Pat. No. 5,057,296); triisopropylbenzene (ref: Kimura, T.; Sugahara, Y.; Kuroda, K. J. *Chem. Soc., Chem. Commun.* 1998, 559); N, N-dimethylhexadecylamine, N, N-dimethyldecylamine, trioctylamine and tridodecylamine (Ref: Sayari, A.; Kruk, M.; Jaroniec, M.; Moudrakovski, I. L. *Adv. Mater.* 1998, 10, 1376); cyclohexane, cyclohexanol, dodecanol, chlorododecane and tetramethylammonium and tetraethylammonium sodium salts (Ref: Corma, A.; Kan, K.; Navarro, M. T.; Pérez-Pariente, J.; Rey, F. *Chem. Mater.* 1997, 9, 2123).

The totally porous starting particles, surfactant and optional swelling agent are subjected to elevated temperature in the aqueous solution (pH adjusted to partially dissolve the metal oxide), preferably under reflux. The surfactant micelles formed in the solution adsorb to the surface of the partially dissolved metal oxide particles. The dissolved metal oxide then re-precipitates onto the particles (into the interstitial spaces between the adsorbed micelles) due to the ionic attraction of the dissolved metal oxide to the adsorbed micelles.

After the treatment, for example reflux, is complete, the particles are separated from the solution (e.g., by centrifugation, filtration and the like), and the particles are subjected to a treatment (e.g., with elevated temperature) to drive off (e.g., combust or volatilize) the surfactant and swelling agent from the particles. If an organic metal oxide (e.g. organosilane) is bound (e.g., covalently) to the particles, the particles are subjected to a solvent extraction treatment (e.g., agitating in ethanol/HCl with elevated temperature) to wash out the surfactant and swelling agent from the particles so that the organosilane still remains bound after such treatment.

If one starts with substantially pure totally porous metal oxide particles of silica, titania or zirconia, to produce the hybrid totally porous particles of this invention using the method of the invention, the pseudomorphic transformation of those particles should be carried out in the presence of an organic metal alkoxide selected from one or more of the formulae I-IV

$$(RO)_3M-R^2-M(OR)_3 \tag{I}$$

$$(RO)_2R^1M-R^2-MR^1(OR)_2 \tag{II}$$

$$(RO)_3M-R^1 \tag{III}$$

$$(RO)_2M-R^1R^1 \tag{IV}$$

wherein R is selected independently in each instance from methyl and ethyl, $R^1$ is independently selected in each instance as defined above, $R^2$ is selected from a substituted or unsubstituted $C_1$ to $C_7$ alkylene, alkenylene, alkynylene, or arylene group bridging two or more M atoms; and M is selected from Si, Ti and Zr.

When M is Si in Formulae I-IV, the organic metal alkoxide is preferably selected from one or more of methyltriethoxysilane, ethyltriethoxysilane, 1,2-bis (triethoxysilyl)methane, 1,2-bis (triethoxysilyl)ethane and 1,2-bis (triethoxysilyl)benzene.

The starting material alkoxides of Formulae I-IV are either commercially available or can be made as taught in standard organometallic synthetic methods.

When substantially pure totally porous metal oxides of silica, titania or zirconia are pseudomorphically transformed in accordance with the method of this invention in the presence of organic metal oxides of formulae I-IV, the resulting product is totally porous particles comprising an organic metal oxide selected from one or more of the formulae VII or VIII:

$$MO_2/(R^1_p R^1_q MO_t)_n \quad \text{(VII)}$$

$$MO_2/[R^2(R^1_r MO_t)_m]_n \quad \text{(VIII)}$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more M atoms; p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is selected from Si, Ti, or Zr. Such particles after pseudomorphic transformation have a median pore size range from about 15 to about 1000 Å, a specific surface area of from about 5 to about 1000 m$^2$/g; and a median size range from about 0.5 μm to about 100 μm.

If one starts with substantially pure totally porous metal oxide particles of alumina, to produce the hybrid totally porous particles of this invention, the pseudomorphic transformation of those particles should carried out in the presence of an organic metal alkoxide selected from one or more of the formulae V or VI:

$$(RO)_2Al{-}R^2{-}Al(OR)_2 \quad \text{(V)}$$

$$(RO)_2Al{-}R^1 \quad \text{(VI)}$$

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more Al atoms.

The alkoxides of Formulae V-VI are either commercially available or can be made as taught in standard organometallic synthetic methods.

When substantially pure porous metal oxides of alumina are pseudomorphically transformed in accordance with the method of this invention in the presence of organic metal oxides of formulae V-VI, the resulting product is totally porous particles, comprising an organic metal oxide selected from one or more of the formulae IX or X:

$$Al_2O_3/(R^1AlO)_n \quad \text{(IX)}$$

$$Al_2O_3/[R^2(AlO)_m]_n \quad \text{(X)}$$

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100. Such particles after pseudomorphic transformation have a median pore size range from about 15 to about 1000 Å, a specific surface area of from about 5 to about 1000 m$^2$/g; and a median size range from about 0.5 μm to about 100 μm.

If the totally porous starting material particles are hybrid metal oxides based on silica, titania or zirconia, they should be selected from one or more of the formulae VII or VIII.

$$MO_2/(R^1_p R^1_q MO_t)_n \quad \text{(VII)}$$

$$MO_2/[R^2(R^1_r MO_t)_m]_n \quad \text{(VIII)}$$

wherein $R^1$ is in each instance independently as defined previously. $R^2$ is a substituted or unsubstituted $C_1$ to $C_7$ alkylene, alkenylene, alkynylene, or arylene group moiety bridging two or more M atoms. p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is selected from Si, Ti, or Zr. Particles of Formulae VII and VIII can be made as taught in U.S. Pat. Nos. 4,017,528, 6,686,035, and 7,223,473 and WO2006039507.

The starting materials of Formulae VII and VIII can be pseudomorphically transformed in accordance with the method of this invention in the presence or absence of one or more organic metal alkoxides of Formulae I-IV in the process. If no such organic metal alkoxide is used, the resultant product is totally porous particles, comprising an organic metal oxide selected from one or more of the formulae VII or VIII:

$$MO_2/(R^1_p R^1_q MO_t)_n \quad \text{(VII)}$$

$$MO_2/[R^2(R^1_r MO_t)_m]_n \quad \text{(VIII)}$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more M atoms; p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is selected from Si, Ti, or Zr. Such particles after pseudomorphic transformation have a median pore size range from about 15 to about 1000 Å, a specific surface area of from about 5 to about 1000 m$^2$/g; and a median size range from about 0.5 μm to about 100 μm.

In the case of the totally porous particles end product of Formulae VII or VIII we prefer that M be Si and in that case, we prefer that $R^1$ be independently selected in each instance from methyl or ethyl and $R^2$ is be selected from methylene, ethylene or 1,2-benzylene.

If the totally porous hybrid starting materials of Formulae VII and VIII are pseudomorphically transformed in accordance with the method of this invention in the presence of one or more organic metal alkoxides of Formulae I-IV in the process, the resultant product is totally porous particles, comprising an organic metal oxide having a composition selected from one or more of Formulae XI-XIV above:

$$MO_2/(R^1_p R^1_q MO_t)_x/(R^1_p R^1_q MO_t)_y \quad \text{(XI)}$$

$$MO_2/(R^1_p R^1_q MO_t)_x/[R^2(R^1_r MO_t)_m]_y \quad \text{(XII)}$$

$$MO_2/[R^2(R^2_r MO_t)_m]_x/(R^1_p R^1_q MO_t)_y \quad \text{(XIII)}$$

$$MO_2/[R^1(R^1_r MO_t)_m]_x/[R^2(R^1_r MO_t)_m]_y \quad \text{(XIV)}$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å with a pore size distribution of no more than about 30% of the median; a specific surface area of from about 5 to about 1000 m²/g; and a median size range from about 0.5 μm to about 100 μm.

If the totally porous starting material particles are hybrid metal oxides based on alumina, they should be selected from one or more of the Formulae IX or X:

  (IX)

  (X)

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100.

The starting materials of Formulae IX and X can be pseudomorphically transformed in accordance with the method of this invention in the presence or absence of one or more organic metal alkoxides of Formulae V-VI in the process. If no such organic metal alkoxide is used, the resultant product is totally porous particles comprising an organic metal oxide selected from one or more of the formulae IX or X:

  (IX)

  (X)

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100. Such particles after pseudomorphic transformation have a median pore size range from about 15 to about 1000 Å, a specific surface area of from about 5 to about 1000 m²/g; and a median size range from about 0.5 μm to about 100 μm.

If the hybrid alumina-based starting materials of Formulae IX and X are pseudomorphically transformed in accordance with the method of this invention in the presence of one or more organic metal alkoxides of Formulae V-VI in the process, the resultant product is totally porous particles, comprising an organic metal oxide having a composition selected from one or more of formulae XV-XVIII:

  (XV)

  (XVI)

  (XVII)

  (XVIII)

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more Al atoms; m is an integer greater than or equal to 2; and x and y each is independently a number from 0.01 to 100. Such particles after pseudomorphic transformation have a median pore size range from about 15 to about 1000 Å, a specific surface area of from about 5 to about 1000 m²/g; and a median size range from about 0.5 μm to about 100 μm.

We prefer totally porous end products based on hybrid silica but, regardless of the base metal oxide starting or end product, we prefer the following:

(1) the starting totally porous metal oxide particles have a median particle size from about 0.5 μm to about 100 μm;

(2) the median size of the end product particles be from about 0.5 μm to about 10 μm, preferably from about 1.0 μm to about 5.0 μm;

(3) the end product totally porous particles have a pore size range from about 60 Å to about 800 Å, more preferably from about 70 Å to about 300 Å;

(4) the end product totally porous particles have a specific surface area from about 5 m²/g to about 300 m²/g; and (5) the end products exhibit at least one X diffraction peak between 0.01° and 10° of the 2θ scan range (due to the ordered pore structure).

In the examples that follow, scanning electron microscopy measurements were conducted on a JEOL 640 (Micron Inc., Delaware), and an example is provided in FIG. 1 for the particles made according to Example 1 below.

The specific surface areas and pore sizes of the porous particles made according to examples below were measured by using nitrogen Brunauer Emmett Teller (BET) isotherm on a Micromeritics analyzer.

The pore size distributions of the particles made according to examples below were calculated on the Barrett Joyner Halanda (BJH) model from a 30-point BET surface area plot.

Particle sizes are determined with a Coulter Multisizer (Beckman-Coulter, USA). For particle size distribution, the standard deviation (sigma) was calculated by dividing the FWHM (full width at half maximum) of the peak by 2.3548.

Carbon loading analysis was done by a Perkin Elmer 2400 elemental analyzer.

The micelle-templated porous particles exhibit at least one diffraction peak between 0.01° and 10° of the 2θ scan range (due to the ordered pore structure) as shown in FIG. 4. X-ray diffraction is a well known characterization technique in the art (R. Jenkins, R. L. Snyder, Introduction to X-ray Powder Diffractometry, John Wiley & Sons, Inc., New York, 1996). The ordered pore structures may be further characterized by symmetry or space groups that are observed from X-ray diffraction, including but not limited to hexagonal, cubic, triclinic, monoclinic, orthorhombic, tetragonal, trigonal and lamellar.

Small angle powder x-ray diffraction patterns of the porous particles were recorded on a PANalytical's X'Pert diffractometer (Dupont Analytical Solutions, Delaware), equipped with a Cu—Kα radiation source.

We provide the following examples of the product and process of this invention. These examples are not intended to limit the invention.

EXAMPLE 1

3.0 g of 5.59 μm Zorbax Rx-SIL particles with a particle size distribution of 8% (Agilent Technologies, Inc.) were slurried in 245 ml deionized water in a flat bottom flask. The starting particles have a surface area of 193 m$^2$/g and a pore size of 89 Å with a pore size distribution of 24%. 35 ml of 30 wt % ammonia hydroxide and 2.0 g of hexadecyltrimethylammonium bromide were added. The mixture was heated at 50° C. for 40 minutes under stirring. 8.5 g of trimethylbenzene was added to the previous solution and stirred for another one hour. 1.5 g of bis(triethoxysilyl)ethane was added and then the solution was refluxed for 20 hours, and then allowed to cool to room temperature. The solution was filtered, washed with water, ethanol and acetone, and dried in a vacuum oven at 100° C. for at least 2 hours. Then the particles were reslurried in 450 ml of ethanol and 10.5 g of 37 wt % hydrogen chloride at 50° C. for 6 hours. The solvent extraction procedure was repeated once.

The final particles have a median particle size of 5.72 μm and a particle size distribution of 8% as measured by the Coulter Counter. The specific surface area of these particles was 396 m$^2$/g measured by the Tristar 3000 analyzer (Micromeritics). The pore size of the final particles is 78 Å with a pore size distribution of 26%. The elemental analysis (carbon loading) was measured by the Perkin Elmer 2400 analyzer (Micro-Analysis, Inc). The measured carbon loading is 2.91% which indicates the organic hydrocarbon is incorporated into the silica framework.

EXAMPLE 2

3.0 g of 3.14 μm Zorbax Rx-SIL particles with a distribution of 14% (Agilent Technologies, Inc.) were slurried in 245 ml deionized water in a flat bottom flask. The starting particles have a surface area of 174 m$^2$/g and a pore size of 97 Å with a pore size distribution of 28%. 35 ml of 30 wt % ammonia hydroxide and 2.0 g of hexadecyltrimethylammonium bromide were added. The mixture was heated at 50° C. for 40 minutes under stirring. 8.5 g of trimethylbenzene was added to the previous solution and stirred for another one hour. 1.5 g of bis(triethoxysilyl)ethane was added and then the solution was refluxed for 20 hours, and then allowed to cool to room temperature. The solution was filtered, washed with water, ethanol and acetone, and dried in a vacuum oven at 100° C. for at least 2 hours. Then the particles were reslurried in 450 ml of ethanol and 10.5 g of 37 wt % hydrogen chloride at 50° C. for 6 hours. The solvent extraction procedure was repeated once.

The final particles have a median particle size of 3.23 μm and a size distribution of 16% as measured by the Coulter Counter. The specific surface area of these particles was 311 m$^2$/g measured by the Tristar 3000 analyzer (Micromeritics). The pore size of the final particles is 79 Å with a size distribution of 36%. The elemental analysis (carbon loading) was measured by the Perkin Elmer 2400 analyzer (Micro-Analysis, Inc). The measured carbon loading is 2.33% which indicates the organic hydrocarbon is incorporated into the silica framework.

EXAMPLE 3

3.0 g of 1.87 μm Zorbax Rx-SIL particles with a distribution of 5% (Agilent Technologies, Inc.) were slurried in 245 ml deionized water in a flat bottom flask. The starting particles have a surface area of 173 m$^2$/g and a pore size of 89 Å with a pore size distribution of 22%. 35 ml of 30 wt % ammonia hydroxide and 2.0 g of hexadecyltrimethylammonium bromide were added. The mixture was heated at 50° C. for 40 minutes under stirring. 8.5 g of trimethylbenzene was added to the previous solution and stirred for another one hour. 1.5 g of bis(triethoxysilyl)ethane was added and then the solution was refluxed for 20 hours, and then allowed to cool to room temperature. The solution was filtered, washed with water, ethanol and acetone, and dried in a vacuum oven at 100° C. for at least 2 hours. Then the particles were reslurried in 450 ml of ethanol and 10.5 g of 37 wt % hydrogen chloride at 50° C. for 6 hours. The solvent extraction procedure was repeated once.

The final particles have a median particle size of 1.94 μm and a size distribution of 8% The specific surface area of these particles was 420 m$^2$/g as measured by the Tristar 3000 analyzer (Micromeritics). The pore size of the final particles is 62 Å with a size distribution of 33%. The elemental analysis (carbon loading) was measured by the Perkin Elmer 2400 analyzer (Micro-Analysis, Inc). The measured carbon loading is 3.23% which indicates that the organic hydrocarbon is incorporated into the silica framework.

The hybrid totally porous particles of this invention can be used in separation devices. A separation device of this invention has a stationary phase comprising such hybrid totally porous particles of the kinds set forth in the Summary of the Invention Section above.

Examples of the separation devices of this invention include chromatographic Columns, chips, solid phase extraction media, pipette tips and disks.

We claim:

1. Totally porous particles, comprising:
    (a) an organic metal oxide selected from one or more of the formulae VII or VIII:

    $$MO_2/(R^1_p R^1_q MO_t)_n \qquad (VII)$$

    $$MO_2/[R^2(R^1_r MO_t)_m]_n \qquad (VIII)$$

wherein R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is a substituted or unsubstituted C$_1$ to C$_7$ alkylene, alkenylene, alkynylene, or arylene group moiety bridging two or more M atoms; p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is selected from Si, Ti, or Zr;
    (b) a median pore size range from about 15 to about 1000 Å;
    (c) a specific surface area of from about 5 to about 1000 m$^2$/g; and
    (d) a median size range from about 0.5 μm to about 100 μm.

2. The totally porous particles of claim 1, wherein the totally porous particles exhibit at least one X-ray diffraction peak between 0.01° and 10° of the 2θ scan range.

3. The totally porous particles of claim 1, wherein M is Si.

4. The totally porous particles of claim 1, wherein $R^1$ is independently selected in each instance from methyl or ethyl and $R^2$ is selected from methylene, ethylene or 1,2-benzylene.

5. The totally porous particles of claim 1, wherein the totally porous particles are created by reacting silica, titania or zirconia particles with an organic metal alkoxide.

6. The totally porous particles of claim 1, wherein the median size of the totally porous particles is from about 0.5 µm to about 10 µm.

7. The totally porous particles of claim 1, wherein the pore size ranges from about 60 Å to about 800 Å.

8. The totally porous particles of claim 1, wherein the specific surface area of the totally porous particles is from about 5 m$^2$/g to about 300 m$^2$/g.

9. The totally porous particles of claim 1, wherein the hybrid porous particles have been surface modified with a surface modifier having the formula $Z_a(R')_b Si$—R, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

* * * * *

UNITED STATES PATENT AND TRADEMARK OFFICE
CERTIFICATE OF CORRECTION

PATENT NO. : 8,828,904 B2  
APPLICATION NO. : 13/712597  
DATED : September 9, 2014  
INVENTOR(S) : Ta-Chen Wei et al.

It is certified that error appears in the above-identified patent and that said Letters Patent is hereby corrected as shown below:

On the title page, item (71), under "Applicant", in column 1, line 1, delete "Intellectual Property Administration," and insert -- Agilent Technologies, Inc., --, therefor.

In the Specification

In column 1, line 10, delete "200," and insert -- 2008, --, therefor.

In the Claims

In column 13, line 3, in claim 2, delete "2θscan range." and insert -- 2θ scan range. --, therefor.

Signed and Sealed this  
Twenty-fourth Day of March, 2015

Michelle K. Lee  
*Director of the United States Patent and Trademark Office*